(12) United States Patent
Lee et al.

(10) Patent No.: US 12,482,607 B2
(45) Date of Patent: Nov. 25, 2025

(54) CAPACITOR COMPONENT AND CAPACITOR-EMBEDDED SUBSTRATE

(71) Applicant: SAMSUNG ELECTRO-MECHANICS CO., LTD., Suwon-si (KR)

(72) Inventors: Sang Jong Lee, Suwon-si (KR); Min Cheol Park, Suwon-si (KR); Chi Hyeon Jeong, Suwon-si (KR); Seong Hwan Lee, Suwon-si (KR); Hyun Sang Kwak, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 487 days.

(21) Appl. No.: 17/875,988

(22) Filed: Jul. 28, 2022

(65) Prior Publication Data
US 2023/0343519 A1   Oct. 26, 2023

(30) Foreign Application Priority Data

Apr. 21, 2022  (KR) ................ 10-2022-0049551

(51) Int. Cl.
| | | |
|---|---|---|
| H01G 4/30 | (2006.01) | |
| H01G 2/06 | (2006.01) | |
| H01G 2/14 | (2006.01) | |
| H01G 4/008 | (2006.01) | |
| H01G 4/012 | (2006.01) | |
| H01G 4/12 | (2006.01) | |

(52) U.S. Cl.
CPC ............ *H01G 4/30* (2013.01); *H01G 2/065* (2013.01); *H01G 2/14* (2013.01); *H01G 4/008* (2013.01); *H01G 4/012* (2013.01); *H01G 4/12* (2013.01)

(58) Field of Classification Search
CPC ............ H01G 4/32; H01G 4/30; H01G 4/008; H01G 4/012; H01G 4/12; H01G 2/14; H01G 2/065
USPC .................. 361/301.5, 321.1, 306.3, 303
See application file for complete search history.

(56) References Cited

U.S. PATENT DOCUMENTS 3,967,168 A * 6/1976 Christensen ............ H01G 4/32
                                                    361/323
4,613,518 A * 9/1986 Ham ...................... H01G 4/232
                                                    427/124

(Continued)

FOREIGN PATENT DOCUMENTS

| JP | 2002-151847 A | 5/2002 |
|---|---|---|
| JP | 4893396 B2 | 3/2012 |
| JP | 2017-022341 A | 1/2017 |

*Primary Examiner* — Arun Ramaswamy
(74) *Attorney, Agent, or Firm* — Morgan, Lewis & Bockius LLP

(57) ABSTRACT

A capacitor component, includes: a body including first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis; a first external electrode disposed on the first surface and connected to the first internal electrode; and a second external electrode disposed on the second surface and connected to the second internal electrode. The first internal electrode and the second internal electrode include different metals.

12 Claims, 12 Drawing Sheets

(56) References Cited

U.S. PATENT DOCUMENTS

| | | | | |
|---|---|---|---|---|
| 6,118,647 | A | * | 9/2000 | Okinaka ................ H01G 4/30 |
| | | | | 29/25.35 |
| 2017/0019999 | A1 | | 1/2017 | Nakashima et al. |
| 2019/0304696 | A1 | * | 10/2019 | Kim ........................ H01G 4/12 |
| 2020/0273624 | A1 | * | 8/2020 | Jogan ...................... H01G 4/33 |
| 2022/0122771 | A1 | * | 4/2022 | Richardson ............ H01G 4/232 |

* cited by examiner

II-II'

III-III'

CAPACITOR COMPONENT AND CAPACITOR-EMBEDDED SUBSTRATE

CROSS-REFERENCE TO RELATED APPLICATION(S)

This application claims benefit of priority to Korean Patent Application No. 10-2022-0049551 filed on Apr. 21, 2022 in the Korean Intellectual Property Office, the disclosure of which is incorporated herein by reference in its entirety.

TECHNICAL FIELD

The present disclosure relates to a capacitor component and a capacitor-embedded substrate.

BACKGROUND

A multilayer ceramic capacitor (MLCC), a capacitor component, is an important chip component used for devices used in the communications, computing, home appliance, automobile industries, and the like, due to advantages thereof such as small size and high capacitance, and in particular, is a core passive element used in various electric, electronic and information communication devices such as mobile phones, computers, digital TVs, and the like.

Due to the advantages of multilayer ceramic capacitors, such as a small size and high capacitance, and ease of mounting, multilayer ceramic capacitors may be used as components of various types of electronic devices. In recent years, in accordance with the miniaturization and implementation of high performance in electronic devices, a multilayer ceramic capacitor has also tended to be miniaturized and to have high capacitance.

As electronic circuits become denser and highly integrated, a mounting space for passive elements mounted on a printed circuit board becomes insufficient. In particular, methods for embedding a capacitor component used as a capacitive component in a substrate have been variously proposed.

As an example of a substrate in which a capacitor component is embedded, a capacitor component having a general rectangular parallelepiped shape is embedded in an insulating layer of a substrate. In this case, an interconnection of the substrate and an external electrode of the capacitor component, a via hole should be formed in upper and lower portions of the insulating layer using a laser, and an inside of the via hole should be filled with a conductive material. Such laser processing increases manufacturing costs of the printed circuit board, may cause damage to the external electrode of the capacitor component, and has a problem in that it is difficult to obtain a desired signal transmission characteristic because an electrical connection path with the active element connected to the board is relatively long.

Therefore, such a capacitor component may be embedded in the substrate without forming a via hole connecting the external electrode of the capacitor component and the conductive layer, and there is a need to improve structures of the capacitor component and the capacitor-embedded substrate capable of securing high capacitance.

SUMMARY

An aspect of the present disclosure is to provide a capacitor component having higher capacitance and improved electrical connectivity, as compared to a general cube-shaped multilayer ceramic capacitor.

An aspect of the present disclosure is to provide a capacitor-embedded substrate having a short connection length between a capacitor and an active element while securing high capacitance of the capacitor component.

According to an aspect of the present disclosure, a capacitor component includes: a body including first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis; a first external electrode disposed on the first surface and connected to the first internal electrode; and a second external electrode disposed on the second surface and connected to the second internal electrode. The first internal electrode and the second internal electrode include different metals.

According to an aspect of the present disclosure, a capacitor-embedded substrate includes: a capacitor component including a body having first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis; a first external electrode disposed on the first surface of the body and connected to the first internal electrode, and the second external electrode disposed on the second surface of the body and connected to the second internal electrode; an insulating layer in which the capacitor component is embedded; and first and second conductive layers respectively disposed on first and second sides opposing each other in the first direction from the insulating layer and respectively connected to the first and second external electrodes.

According to another aspect of the present disclosure, a capacitor component includes: a body including first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis; a first external electrode disposed on the first surface of the body and connected to the first internal electrode; and a second external electrode disposed on the second surface of the body and connected to the second internal electrode. The first internal electrode includes a region protruding from the first surface of the body in the first direction. The first dielectric layer, the second dielectric layer, and the second external electrode are terminated at the first surface. The second internal electrode includes a region protruding from the second surface of the body in a direction opposing the first direction. The first dielectric layer, the second dielectric layer, and the first external electrode are terminated at the second surface

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
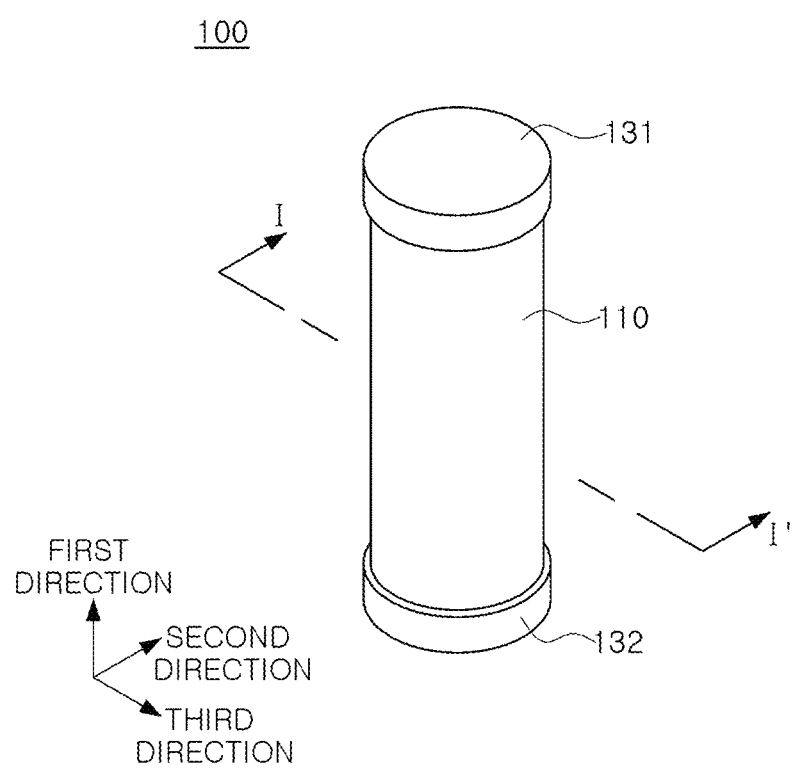
FIG. 1 is a perspective view schematically illustrating a capacitor component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

FIG. 1 is a perspective view schematically illustrating a capacitor component according to an embodiment of the present disclosure.

Figure 2:
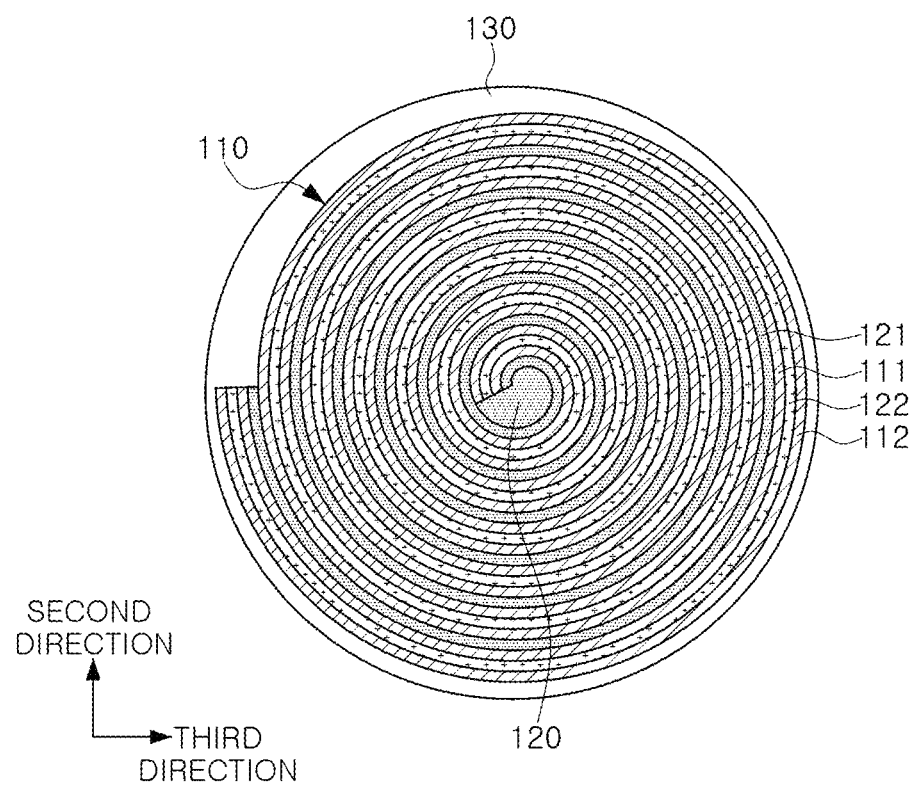
FIG. 2 is a cross-sectional view taken along line I-I' of FIG. 1.

FIG. 2 is a cross-sectional view taken along line I-I' of FIG. 1.

Figure 3:
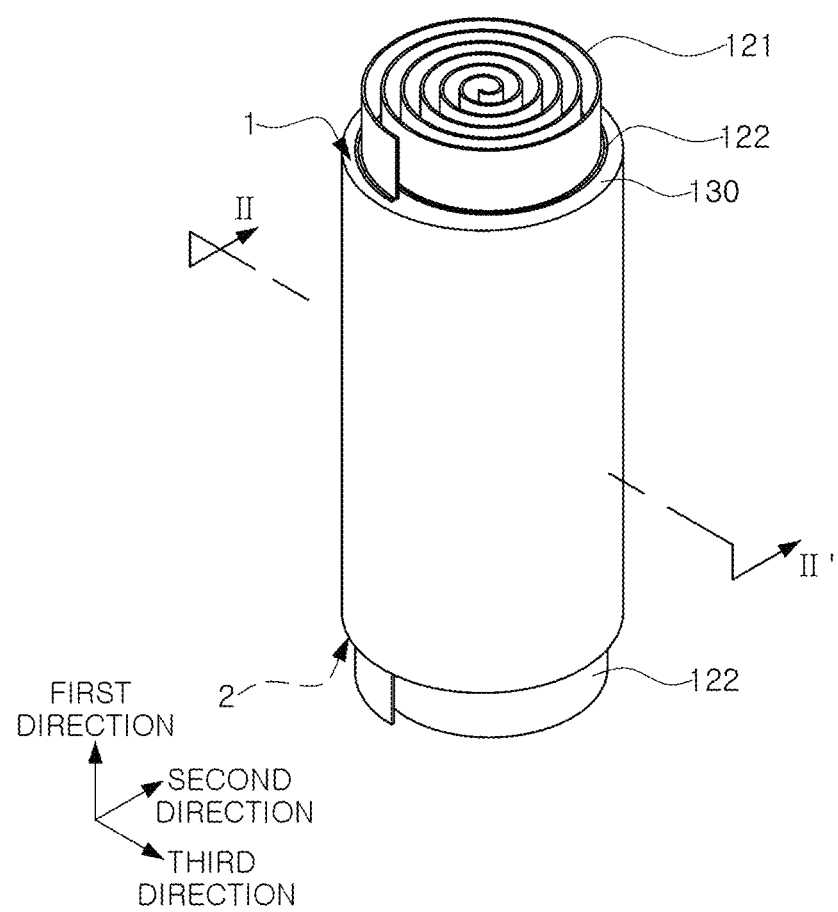
FIG. 3 is a perspective view illustrating a shape of a capacitor component according to an embodiment except for an external electrode.

FIG. 3 is a perspective view illustrating a shape of a capacitor component according to an embodiment except for an external electrode.

Hereinafter, a capacitor component 100 according to an embodiment of the present disclosure will be described with reference to FIGS. 1 to 3.

The capacitor component 100 according to an aspect of the present disclosure includes: a body 110 including first and second surfaces 1 and 2 opposing each other in a first direction. In the body 110, a first internal electrode 121, a second internal electrode 122, a first dielectric layer 111 disposed to be in contact with the first and second internal electrodes 121 and 122, and a second dielectric layer 112 disposed on the second internal electrode 122 are wound in the first direction as a winding axis; a first external electrode 131 disposed on the first surface 1 of the body 110 and connected to the first internal electrode 121; and a second external electrode 132 disposed on the second surface 2 of the body 110 and connected to the second internal electrode 122. The first internal electrode 121 and the second internal electrode 122 include different metals.

The body 110 may include first and second surfaces 1 and 2 opposing each other in a first direction, and may be formed by winding a first internal electrode 121, a second internal electrode 122, a first dielectric layer 111 disposed to be in contact with the first and second internal electrodes 121 and 122, and a second dielectric layer 112 disposed to be in contact with the internal electrode, in the first direction as a winding axis.

The body 110 may have a substantially cylindrical shape because ceramic powder particles included in the body 110 are contracted in a process in which the body is sintered.

A method of winding of the body 110 is not particularly limited. For example, the body 110 may be formed by disposing the first internal electrode 121 on an uppermost surface, and sequentially disposing the first dielectric layer 111, the second internal electrode 122, and the second dielectric layer 112, and then winding an edge of one end of the first internal electrode as a winding axis and then sintering the same. In this case, a central axis 120 of the body 110, a winding axis, may be formed of the first internal electrode formed in the first direction, but an embodiment thereof is not limited thereto, and may be formed of a dielectric pillar formed of a separate dielectric material.

Referring to FIG. 2, the first dielectric layer 111 may be interposed between the first internal electrode 121 and the second internal electrode 122, and the second dielectric layer 112 may be disposed on the second internal electrode 122. That is, the first internal electrode 121, the first dielectric layer 111, the second internal electrode 122, and the second dielectric layer 112 may be sequentially disposed, and one end of the first internal electrode 121 may be wound and disposed in a first direction. In this case, the winding axis may be a central axis 120 of the body as described above, and the central axis 120 may be formed of an end of the first internal electrode 121 or may have a form in which a separate dielectric pillar is disposed. Accordingly, the first internal electrode 121 and the second internal electrode 122 may be insulated by the first and second dielectric layers 111 and 112, even in a wound state. Meanwhile, it is easy to form the body 110 by winding the first and second internal electrodes 121 and 122 and the first and second dielectric layers 111 and 112 in an overlapping state, but an embodiment thereof is not limited thereto.

According to an embodiment of the present disclosure, a raw material of the first and second dielectric layers 111 and 112 is not particularly limited as long as sufficient capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, as the raw material for forming the first and second dielectric layers 111 and 112, various ceramic additives, organic solvents, binders, dispersants, and the like, may be added to powder particles such as barium titanate ($BaTiO_3$) powder particles, or the like, according to the purpose of the present disclosure.

The first internal electrode 121 and the second internal electrode 122 may be disposed to extend spirally from the central axis of the body 110. One end of the first internal electrode 121 in the first direction may be in contact with the first surface 1 of the body 110, and one end of the second internal electrode 122 in the first direction may be in contact with the second surface 2 of the body. Thereby, the first internal electrode 121 may be connected to a first external electrode 131 to be described later, and the second internal electrode 122 may be connected to a second external electrode 132 to be described later.

A material of the first and second internal electrodes 121 and 122 is not particularly limited, and may be a material having excellent electrical conductivity. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the first and second internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for internal electrodes may be a screen-printing method, a gravure printing method, or the like, but embodiments of the present disclosure are not limited thereto.

The external electrodes 131 and 132 may be disposed on the first surface 1 and the second surface 2 of the body 110 to be connected to the internal electrodes 121 and 122.

Specifically, the first external electrode 131 may be disposed on the first surface 1 to be connected to the first internal electrode 121, and the second external electrode 132 may be disposed on the second surface 2 to be connected to the second internal electrode 122.

A structure, in which the multilayer electronic component 100 has two external electrodes 131 and 132, has been described in the present embodiment. However, the number and shape of the external electrodes 131 and 132 may vary depending on the shape of the internal electrodes 121 and 122 or other objects.

Meanwhile, the external electrodes 131 and 132 may be formed using any material as long as they have electrical conductivity, such as metal, and a specific material may be determined in consideration of electrical characteristics and structural stability.

Meanwhile, the external electrodes 131 and 132 may be formed as a monolayer or a multilayer structure, and a plating layer may be disposed on the first and second external electrodes 131 and 132.

A method of forming the external electrodes 131 and 132 on the body 110 is not particularly limited, and may be formed using processes such as physical vapor deposition (PVD), chemical vapor deposition (CVD), atomic layer deposition (ALD), sputtering, plating, dipping, and the like.

Meanwhile, when the external electrodes 131 and 132 are formed by a deposition method, or plating, the external electrodes may not include a glass component. In this case, even if the external electrodes 131 and 132 are embedded in a substrate, to be described later, to form a via through laser processing to connect the conductive layer and the external electrodes 131 and 132, erosion of glass may not occur, so that the reliability of the capacitor component may be improved.

The plating layer may serve to improve mounting characteristics when the capacitor component is mounted on a substrate, and may serve to improve electrical connectivity when embedded in the substrate. The type of the plating layer is not particularly limited, and may be a plating layer including at least one of Ni, Sn Pd, and alloys thereof, and may be formed of a plurality of layers.

As a more specific example of the plating layer, the plating layer may be a Ni plating layer or a Sn plating layer, and may be a form in which a Ni plating layer and a Sn plating layer are sequentially formed on the electrode layer, and a Sn plating layer, and a Ni plating layer and a Sn plating layer are sequentially formed. In addition, the plating layer may include a plurality of Ni plating layers and/or a plurality of Sn plating layers.

According to an embodiment of the present disclosure, the first internal electrode 121 and the second internal electrode may include different metals.

When the body 110 is formed by winding the first internal electrode 121, the second internal electrode 122, the first dielectric layer 111, and the second dielectric layer 112 to overlap as in an embodiment of the present disclosure, there is a problem in that it is difficult to connect the first internal electrode 121 and the second internal electrode 122 to the first and second external electrodes 131 and 132 having different polarities, respectively. Specifically, the first internal electrode should be connected only with a first external electrode disposed on the first surface, and the second internal electrode should be connected only with a second external electrode disposed on the second surface, but since the first and second internal electrodes, and the first and second dielectric layers are wound to overlap each other, a portion in which both the first and second internal electrodes are connected to the first and second external electrodes may be formed, which may result in loss of capacitance.

When the first and second internal electrodes include different metal elements as in an embodiment of the present disclosure, by connecting the first internal electrode and the second internal electrode to external electrodes having different polarities through selective etching, to be described later, a structure capable of securing capacitance can be more easily formed.

When the first and second external electrodes 131 and 132 are disposed on the body 110, to secure electrical conduction with the first and second internal electrodes 121 and 122, since only a portion of the first internal electrode and the second internal electrode, in contact with the first surface 1 or the second surface 2, is respectively connected to the external electrodes 131 and 132, it may be difficult to secure electrical connectivity.

FIG. 3 is a perspective view illustrating a shape of the capacitor component 100 according to an embodiment excluding external electrodes.

Figure 4:
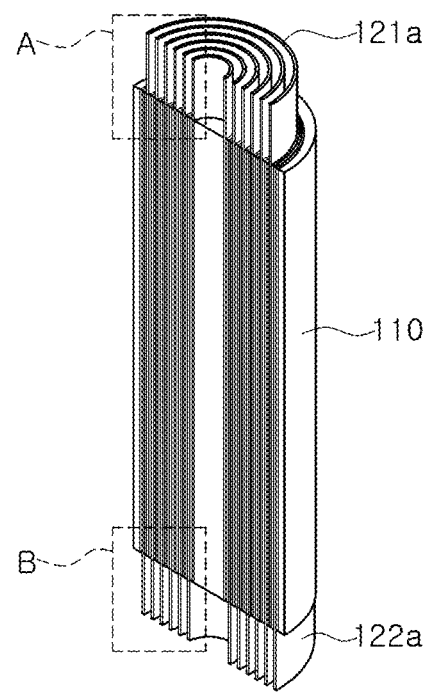
FIG. 4 is a cross-sectional view taken along line II-II' of FIG. 3.

FIG. 4 is a cross-sectional view taken along line II-II' of FIG. 3.

Figure 5:
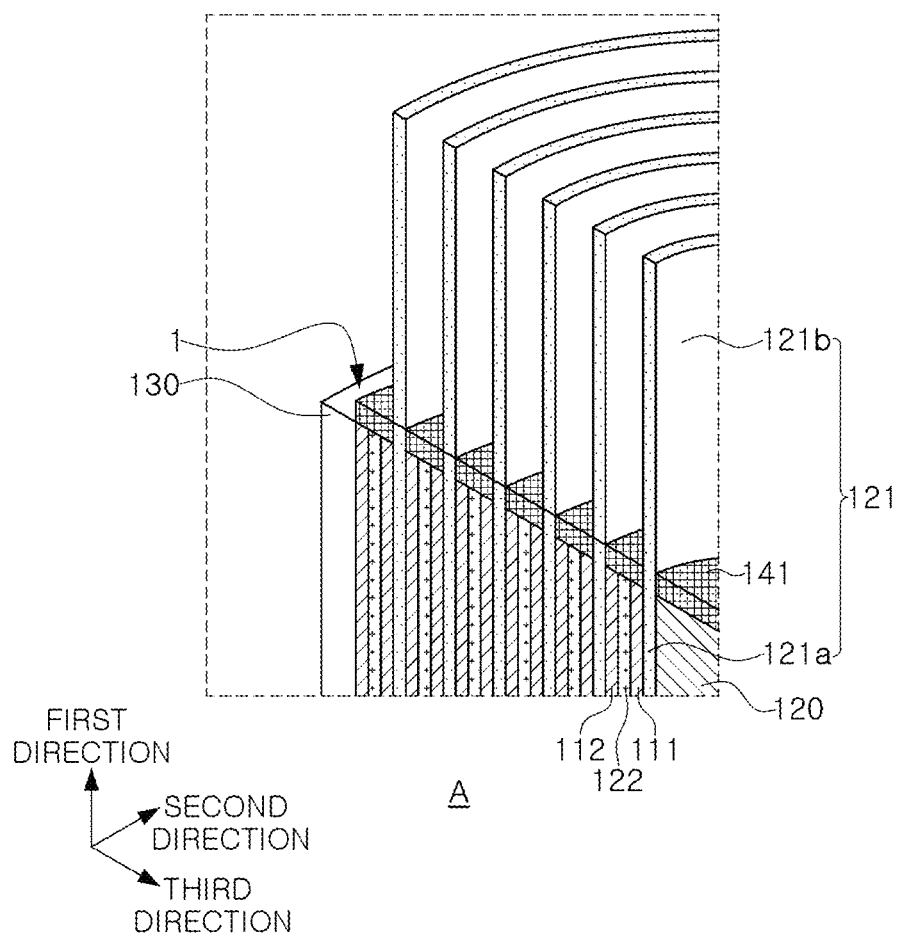
FIG. 5 is an enlarged view of area A of FIG. 4.

FIG. 5 is an enlarged view of area A of FIG. 4.

Figure 6:
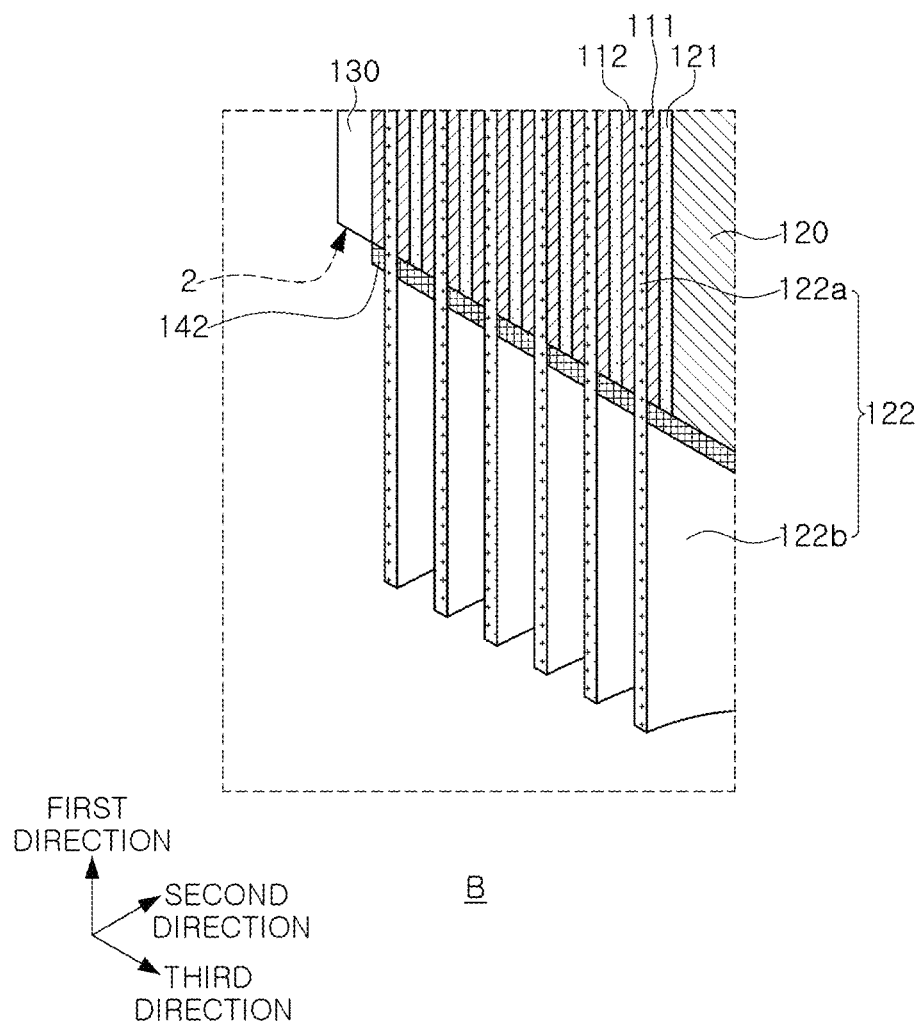
FIG. 6 is an enlarged view of area B of FIG. 4.

FIG. 6 is an enlarged view of area B of FIG. 4.

Referring to FIGS. 3 to 6, in an embodiment, the first internal electrode 121 may include a region 121b protruding from the first surface 1 of the body 110 in the first direction, and the second internal electrode 122 may include a region 122b protruding from the second surface 2 of the body 110 in a direction opposing the first direction. That is, the first internal electrode 121 may include a region 121a disposed inside the body 110 and a region 121b protruding from the first surface 1 thereof in the first direction, and the second internal electrode 122 may include a region 122a disposed inside the body 110 and a region 122b protruding from the second surface 2 thereof in a direction opposing the first direction. Accordingly, a contact area between the internal electrodes 121 and 122 and the external electrodes 131 and 132 may increase, thereby improving the strength of the capacitor component 100 and improving electrical connectivity.

A method of forming the protruding regions 121b and 122b of the internal electrode is not particularly limited. For example, the regions may be formed by removing the second internal electrode 122, and the first and second dielectric layers 111 and 112 to a predetermined thickness through selective etching in the first direction, while leaving the first internal electrode 121 on the first surface 1 of the body 110, and may be formed by removing the first internal electrode 121, and the first and second dielectric layers 111 and 112 to a predetermined thickness through selective etching in the first direction, while leaving the second internal electrode 122 on the second surface 2.

Meanwhile, when the protruding regions 121a and 122a of the first and second internal electrodes 121 and 122 are formed through selective etching, the first surface 1 after etching may be in contact with one end of the second internal electrode 122, and the second surface 2 may be in contact with one end of the first internal electrode 121. Accordingly, when the first external electrode 131 and the second external electrode 132 are disposed on the first surface 1 and the second surface 2, respectively, the external electrodes 131 and 132 may be simultaneously connected to the internal electrodes 121 and 122, which may cause a short circuit. In an embodiment, when one end of the second internal electrode 122 is in contact with the first surface 1 of the body 110, and one end of the first internal electrode 121 is in contact with the second surface 2 of the body 110, short-circuit layers 141 and 142 may be disposed on one end of the second internal electrode 122, in contact with the first surface 1 of the body 110 and one end of the first internal electrode 121, in contact with the second surface 2 of the body 110, so that the connection between the first external electrode 131 and the second internal electrode 122 may be prevented and the connection between the second external electrode 132 and the first internal electrode 121 may be prevented, to prevent a short circuit.

The type of the short-circuit prevention layers 141 and 142 is not particularly limited, and may include the same components as those of the first and second dielectric layers.

Figure 7:
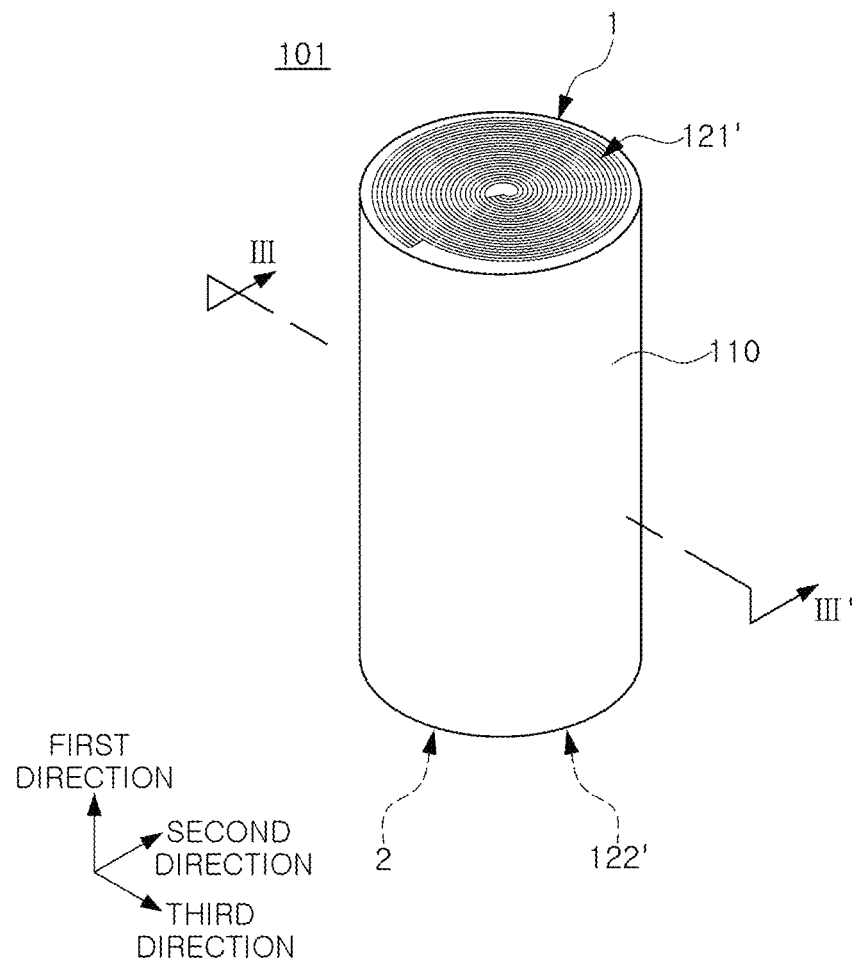
FIG. 7 is a perspective view illustrating a shape of a capacitor component according to an embodiment except for as external electrode.

FIG. 7 is a perspective view illustrating a shape of the capacitor component 101 according to an embodiment except for external electrodes.

Figure 8:
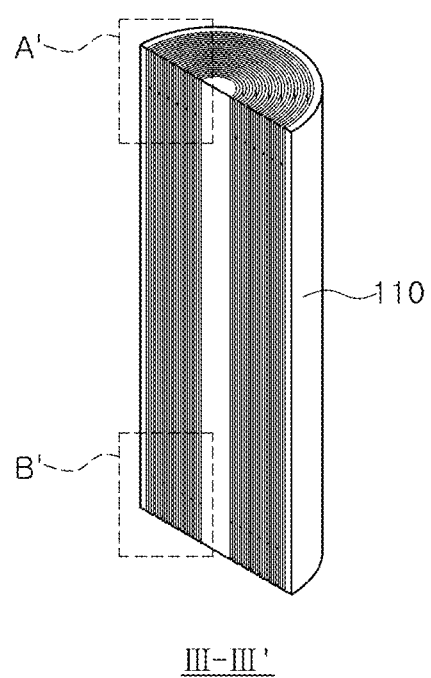
FIG. 8 is a cross-sectional view taken along line III-III' of FIG. 7.

FIG. 8 is a cross-sectional view taken along line III-III' of FIG. 7.

Figure 9:
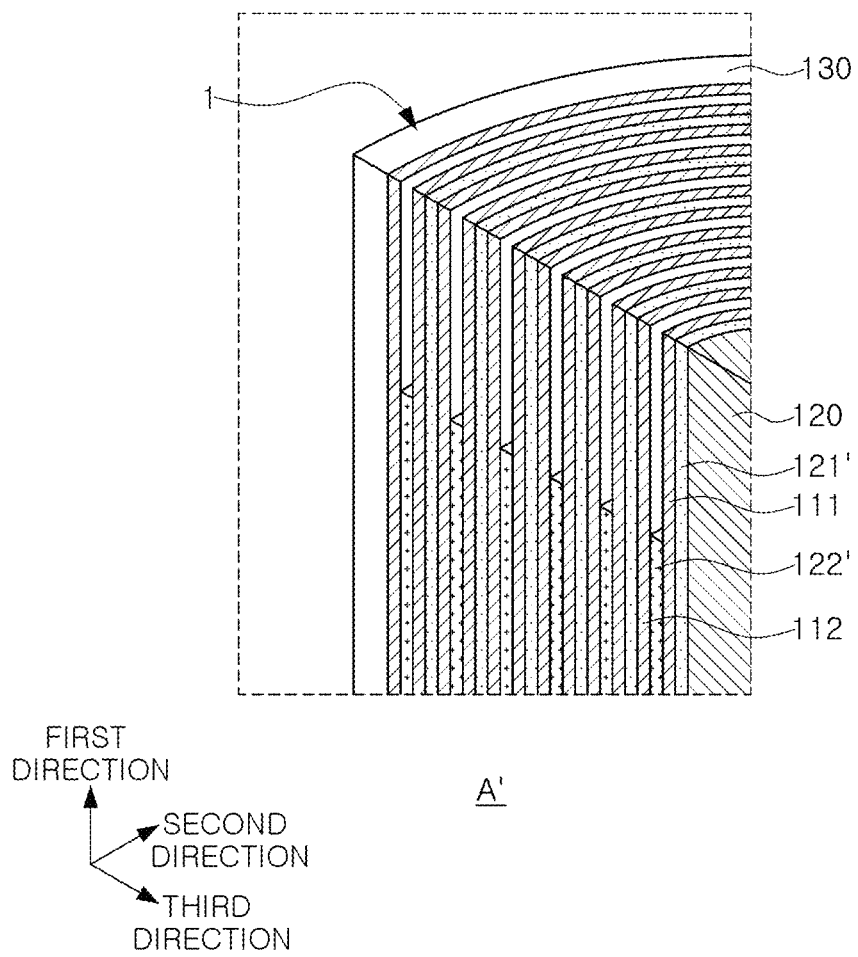
FIG. 9 is an enlarged view of area A' of FIG. 8.

FIG. 9 is an enlarge view of area A' of FIG. 8.

Figure 10:
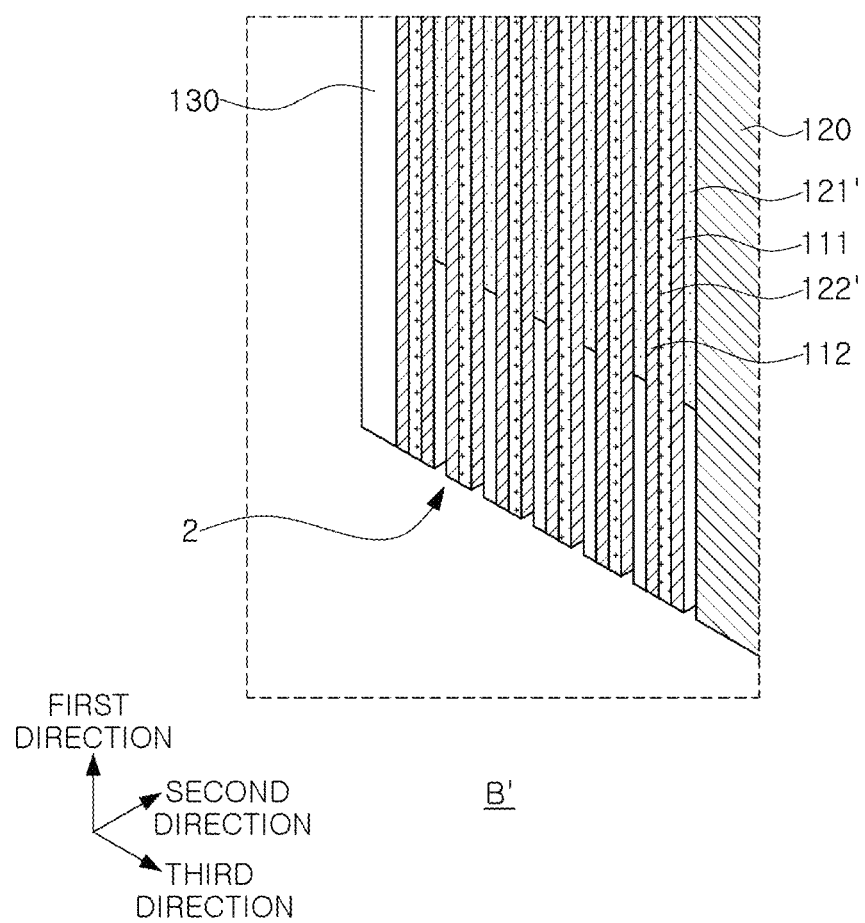
FIG. 10 is an enlarged view of area B' of FIG. 8.

FIG. 10 is an enlarge view of area B' of FIG. 8.

Referring to FIGS. 7 to 10, the second internal electrode 122' of the capacitor component 101 according to an embodiment may be disposed to be spaced apart from the first surface 1 of the body 110, and the first internal electrode 121' may be disposed to be spaced apart from the second surface of the body 110. Accordingly, the first external electrode 131 may be connected to the first internal electrode 121' on the first surface 1, and the second external electrode 132 may be connected to the second internal electrode 122' on the second surface 2.

Meanwhile, the second internal electrode 122' is disposed to be spaced apart from the first surface 1 of the body 110, and a method of forming the first internal electrode 121' to be disposed to be spaced apart from the second surface of the body 110 is not particularly limited.

For example, the second internal electrode 122', in contact with the first surface 1 of the body 110 may be removed to a predetermined thickness through selective etching in the first direction, and the first surface 121', in contact with the second surface 2 may be removed to a predetermined thickness through selective etching in the first direction.

A cover layer 130 may serve to protect the capacitor component from external moisture and to prevent damage to the internal electrode due to physical or chemical stress.

The cover portion 130 may be disposed to cover both a dielectric layer disposed on an outermost side of the body 110 and first and second internal electrodes disposed to overlap an end of the wound body.

The cover portion 130 may not include an internal electrode, and may include the same material as the first and second dielectric layers 111 and 112, and may include, for example, a barium titanate ($BaTiO_3$)-based ceramic material.

In addition, when the cover portion 130 is mounted or embedded in a substrate, the cover portion may include an epoxy molding compound (EMC) containing silica, an epoxy resin, a phenol resin, or the like, to improve resistance to vibration, shocks and humidity.

Figure 11:
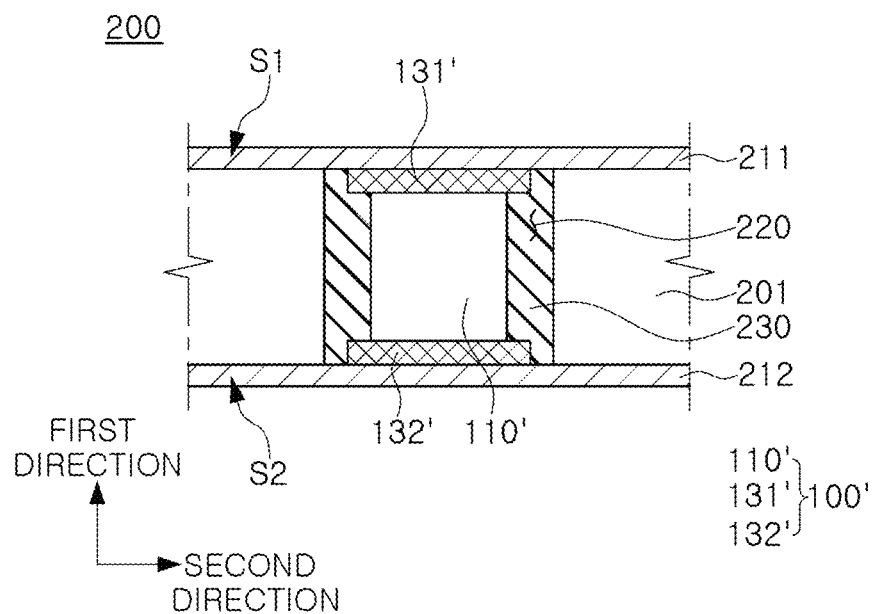
FIG. 11 is a cross-sectional view schematically illustrating a capacitor-embedded substrate according to an embodiment of the present disclosure.

FIG. 11 is a cross-sectional view schematically illustrating a capacitor-embedded substrate 200 according to an embodiment of the present disclosure.

Figure 12:
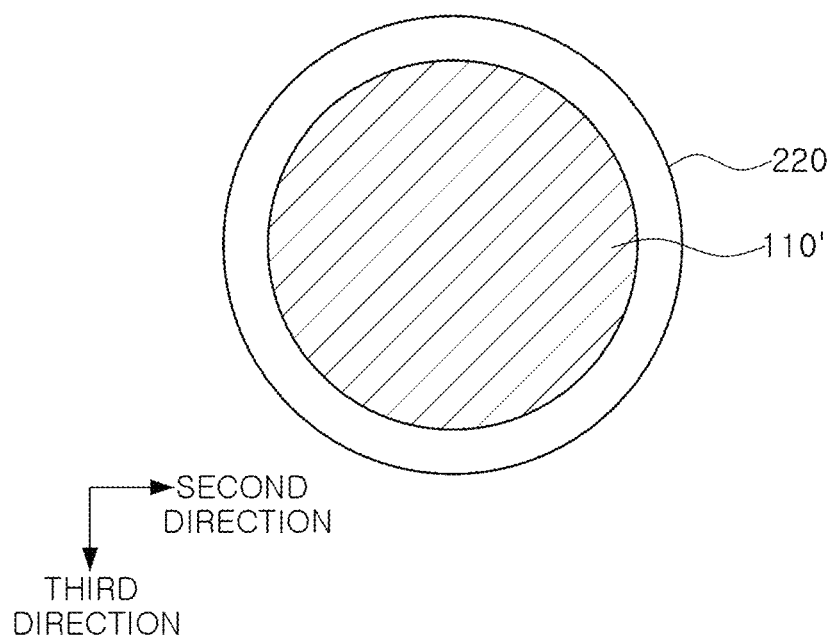
FIG. 12 is a cross-sectional view illustrating shapes of capacitor components and via holes cut in a plane, perpendicular to a first direction in a capacitor-embedded substrate according to an embodiment of the present disclosure.

FIG. 12 is a cross-sectional view illustrating a shape of a capacitor component 100' and a via hole cut, in a plane perpendicular to a first direction in the capacitor-embedded substrate 200 according to an embodiment of the present disclosure.

Hereinafter, the capacitor-embedded substrate 200 according to an embodiment of the present disclosure will be described with reference to FIGS. 11 and 12, but a description overlapping with the capacitor component 100 according to an embodiment of the present disclosure will be omitted.

The capacitor-embedded substrate 200 according to an embodiment of the present disclosure, includes: a capacitor component 100' including a body having first and second surfaces opposing each other in a first direction, wherein, in the body, a first internal electrode, a second internal electrode, a first dielectric layer disposed to be in contact with the first and second internal electrodes, and a second dielectric layer disposed on the second internal electrode are wound in the first direction as a winding axis, a first external electrode disposed on the first surface and connected to the first internal electrode, and the second external electrode disposed on the second surface; an insulating layer in which the capacitor component is embedded; and first and second conductive layers respectively disposed on first and second sides opposing each other in the first direction in the insulating layer and connected to the first and second external electrodes, respectively.

Referring to FIG. 11, the capacitor-embedded substrate 200 according to an embodiment of the present disclosure includes a capacitor component 100', an insulating layer 201, and first and second conductive layers 211 and 212.

Figure 13:
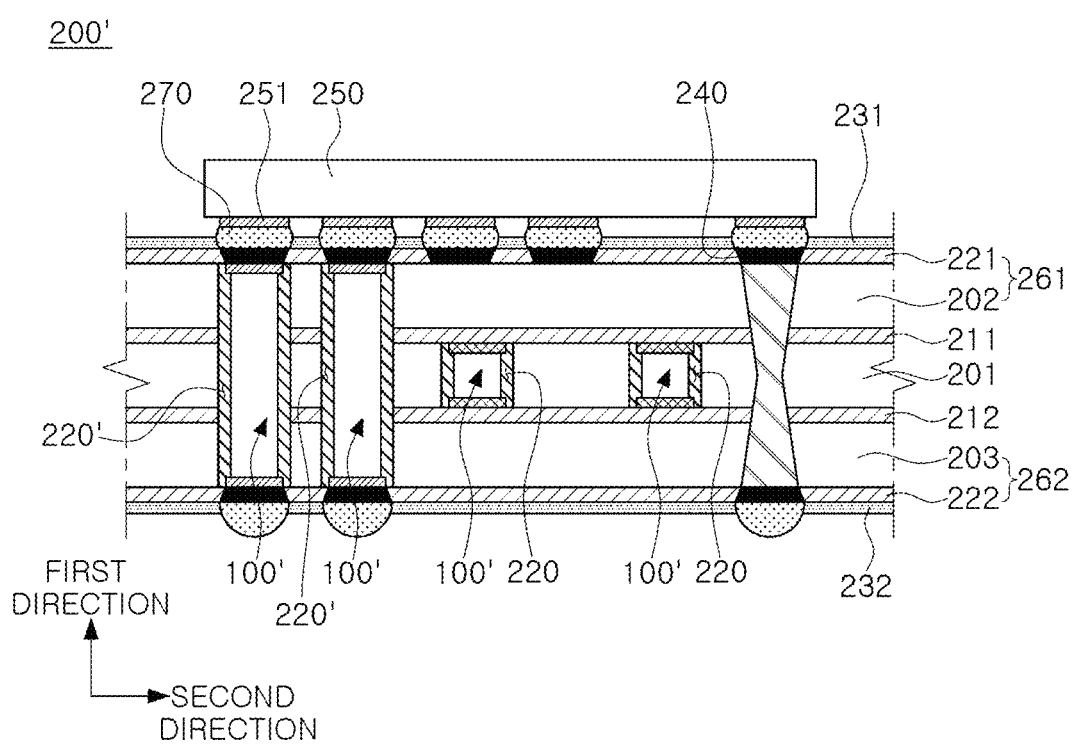
FIG. 13 is a cross-sectional view schematically illustrating a capacitor-embedded substrate according to an embodiment.

The insulating layer 201 may serve to protect an interlayer insulation and a conductive layer, and to protect the capacitor component by embedding the same. In FIG. 11, it is illustrated that the capacitor-embedded substrate 200 includes a single insulating layer 201, but as illustrated in FIG. 13 to be described later, capacitor-embedded substrate 200' may further include a plurality of build-up insulating layers 202 and 203.

The capacitor component 100' is embedded in the insulating layer 201. In this case, the capacitor component 100' is embedded in the insulating layer 201, which may mean that the capacitor component 100' is included in the insulating layer 201, but an embodiment thereof is not limited thereto. When the capacitor-embedded substrate includes a plurality of build-up insulating layers 202 and 203 as illustrated in FIG. 13, which may mean the capacitor component 100' is included in the plurality of insulating layers 201, 202, and 203.

As a material of the insulating layer 201, a thermosetting resin such as epoxy or a thermoplastic resin such as polyimide may be used, and a prepreg in which a reinforcing material such as glass fiber or inorganic filler is impregnated into the resin may also be used.

First and second conductive layers 211 and 212 may be respectively disposed on a first side S1 and a second side S2 of the insulating layer 201 opposing in a first direction.

The first and second conductive layers 211 and 212 may be connected to external electrodes 131' and 132' of the capacitor component 100' embedded in the insulating layer 201. Meanwhile, the first and second conductive layers 211 and 212 need not include only a conductive material, but may include a conductive pattern and a dielectric layer simultaneously.

The first and second conductive layers 211 and 212 may be divided into a ground interconnection forming a ground region, a power interconnection serving as a means of supplying power, and a signal interconnection performing a signal transmission function, depending on the purpose. Electrical connections between respective layers may be performed through vias. In the present embodiment, a substrate in which the conductive layers 211 and 212 are configured in one layer is illustrated, but an embodiment thereof is not limited thereto, and the number of conductive layers may increase or decrease according to design.

Meanwhile, the capacitor component 100' embedded in the insulating layer 201 of the capacitor-embedded substrate 200 according to an embodiment includes a body 110' including first and second surfaces opposing each other in a first direction, wherein in the body, a first internal electrode, a second internal electrode, a first dielectric layer disposed to be in contact with the first and second internal electrodes, and a second dielectric layer disposed to be in contact with the second internal electrode are wound in the first direction as a winding axis, a first external electrode 131' disposed on the first surface of the body and connected to the first internal electrode, and the second external electrode 132' disposed on the second surface.

That is, unlike the capacitor component 100 according to an embodiment of the present disclosure, the first and second internal electrodes do not necessarily include different metals, and except therefor, may include the same configuration as the capacitor component 100 according an embodiment of the present disclosure.

Meanwhile, in an embodiment, it is illustrated that one capacitor component 100' is embedded in the insulating layer, but this is merely an example and the number thereof is not limited.

When a multilayer ceramic capacitor having a general rectangular parallelepiped shape is embedded in a substrate, since the multilayer ceramic capacitor is attached to one surface of the insulating layer and connected to a conductive layer, an electrical connection path may be elongated, while signal transmission characteristics of the capacitor-embedded substrate may deteriorate.

According to an embodiment of the present disclosure, since a capacitor component 100' includes a body 110' including first and second surfaces opposing each other in a first direction, wherein in the body 110', a first internal electrode, a second internal electrode, a first dielectric layer disposed to be in contact with the first and second internal electrodes, and a second dielectric layer disposed to be in contact with the second internal electrode are wound in the first direction as a winding axis, a first external electrode 131' disposed on the first surface and connected to the first internal electrode, and the second external electrode 132' disposed on the second surface, first and second conductive layers may be respectively disposed to first and second external electrodes. Accordingly, since the capacitor component 100' can be simultaneously connected to the first side and the second side of the insulating layer, an electrical connection path can be minimized, and thus the signal transmission characteristic of the capacitor-embedded substrate 200 can be improved.

In an embodiment, the first external electrode 131' may be connected to a first side S1 of the insulating layer, and the second external electrode 132' may be connected to a second side S2 of the insulating layer. That is, when a capacitor having a general rectangular parallelepiped shape is embedded, unlike the case in which the external electrodes are connected to either side of the first side S1 or the second side S2, the first and second external electrodes 131' and 132' may be respectively connected to the first side S1 and the second side S2 of the insulating layer, so that the signal transmission characteristics of the capacitor-embedded substrate 200 may be further improved.

Meanwhile, referring to FIG. 11, the insulating layer may include a via hole 220.

The via hole 220 may be formed to penetrate through from the first side S1 to the second side S2 of the insulating layer 201 in the first direction, and the method thereof is not particularly limited. For example, the via hole 220 may be formed by a physical penetration method such as drilling or laser processing on the surface of the insulating layer, or by chemical etching after forming a patterned protective layer on the insulating layer.

In an embodiment, the insulating layer 201 may include a via hole 220, and the capacitor component 100' may be disposed inside the via hole. Accordingly, a substrate 200 in which the capacitor component 100' having high capacitance may be implemented using a space inside the via hole more efficiently, than when a general rectangular parallelepiped multilayer ceramic capacitor is disposed in the via hole.

In this case, referring to FIG. 12, in order to implement the substrate 200 in which the capacitor component 100' having high capacitance is embedded, on a plane, perpendicular to the first direction, a ratio of a cross-sectional area of the capacitor component 110' to a cross-sectional area of the via hole 220 is preferably 65% or more.

An upper limit of the ratio of the cross-sectional area of the capacitor component 100' to the cross-sectional area of the via hole 220 is not particularly limited, and may be determined according to the size and construction method of the capacitor component 100'.

A method of measuring the cross-sectional area of the via hole and the capacitor component on the plane, perpendicular to the first direction is not particularly limited. For example, an image obtained by observing the cross-section of the insulating layer of the capacitor-embedded component 200 at five points at equal intervals in the first direction with an optical microscope is imaged through an ImageJ program, and an average area thereof can be measured.

Meanwhile, an additional insulating layer 230 may be disposed in a space between the via hole 220 and the capacitor component 100'. The additional insulating layer 230 may serve to stably dispose the capacitor component 100' in an empty space of the via hole 220. The component of the additional insulating layer 230 is not particularly limited, and may be formed of substantially the same component as the insulating layer 201, and a metal component may be further added to smoothly dissipate heat generated from the capacitor component 100'.

In an embodiment, the first external electrode 131' may be in direct contact with the first conductive layer 211, and the second external electrode 132' may be in direct contact with the second conductive layer 212. Accordingly, an electrical connection path between the capacitor component 100' and an electronic component that can be mounted on the substrate 200 may be shortened, so that the signal transmission characteristics of the capacitor-embedded substrate 200 may be improved.

In addition, there is no need to connect the conductive layers 211 and 212 to the external electrodes 131' and 132' of the capacitor component 100' by forming a separate via after embedding the capacitor component 100' in the insulating layer, so that it is possible to prevent damage to the capacitor component 100' due to via processing, thereby improving the reliability of the capacitor-embedded substrate 200.

A method of allowing the first external electrode to be in direct contact with the first conductive layer and the second external electrode to be in direct contact with the second conductive layer is not particularly limited. For example, it may be implemented through a structure in which the first external electrode and the second external electrode have regions protruding onto a first side and a second side of the insulating layer, and the first and second conductive layers are in contact with to surround the protruding regions of the first and second external electrodes.

FIG. 13 is a cross-sectional view schematically illustrating a capacitor-embedded substrate 200' according to an embodiment.

Referring to FIG. 13, a capacitor-embedded substrate 200' according to an embodiment may further include a plurality of build-up layers 261 and 262 disposed on a first side S1 and a second side S2 of the insulating layer.

The plurality of build-up layers 261 and 262 may be completed stacking a separate insulating material and forming a via hole using a YAG laser or a CO2 laser, followed by a semi-additive process (SAP), a modified semi-additive process (MSAP), or the like, to form a conductive layer including a via. Meanwhile, although FIG. 13 illustrates a structure in which one layer is further tanned on one surface of a first conductive layer and a second conductive layer, it is not necessarily a three-layer structure, and may be formed by stacking two or more build-up layers.

The build-up layers 261 and 262 may include build-up insulating layers 202 and 203 and build-up conductive layers 221 and 222 on the build-up insulating layers 202 and 203, respectively, and may have a form in which build-up conductive layers 221 and 222 are disposed on build-up insulating layers 202 and 203.

In addition, the build-up conductive layers 221 and 222 may include a conductive pattern like the conductive layers 211 and 212.

In an embodiment, the insulating layers 201, 202, and 203 may include an insulating layer 201 and build-up insulating layers 202 and 203. In this case, a capacitor component 100' is embedded in the insulating layers 201, 202, and 203, which may mean the capacitor component 100' is included in one insulating layer among the insulating layers 201, 202, and 203, but the present disclosure is not limited thereto, and may mean that the capacitor component 100' is included in a plurality of insulating layers among the insulating layers 201, 202, and 203.

According to an embodiment, the insulating layer 201 may include the plurality of capacitor components 100', and at least one of the plurality of capacitor components 100' may be disposed to penetrate through at least one of the build-up layers 261 and 262. Accordingly, by minimizing an electrical connection path between the capacitor component 100' and an electronic component 250, a signal transmission characteristic of the capacitor-embedded substrate 200' can be further improved.

In this case, the plurality of build-up layers 261 and 262 may include a plurality of via holes 220' penetrating through all or a portion of the build-up layer, and the capacitor component 110' may be disposed inside the plurality of via holes 220' penetrating through all or a portion of the build-up layer. The capacity capacitor component 100' having high capacitance may be embedded by efficiently using a space inside the plurality of build-up layers 261 and 262, and a signal transmission characteristic of the capacitor-embedded substrate 200' can be improved.

Similarly thereto, an additional insulating layer may be interposed between the plurality of via holes 220' and the capacitor component 110', and functions and components thereof may be substantially the same as those of the additional insulating layer 230.

Solder resist layers 231 and 232 are stacked above the build-up conductive layers 221 and 222 located on an outermost layer of the capacitor-embedded substrate 200'. The solder resist layer is a layer for protecting the build-up conductive layers 221 and 222 located on the outermost layer from external contamination and contact, and may include a photosensitive resin composition.

A cavity exposing surfaces of the first and second external electrodes or a surface of a via electrode externally may be formed in the solder resist layers 231 and 232, and a solder ball 270 is provided in the cavity. Meanwhile, a lower surface of the electronic component 250 is bonded to the solder ball 270 and mounded on a surface of the substrate.

In this case, the type of the electronic component 250 is not particularly limited, and may be firmly attached to the solder ball 270 through an adhesive layer 251.

The solder resist layers 231 and 232 may be coated in a liquid form or a dry resin film is laminated, exposed by attaching a mask, and then an uncured portion is developed by light to form a cavity for exposing the surfaces of the first and second external electrodes or via electrodes externally. Thereafter, a conductive paste may be filled in the cavity to form a solder ball, and an electronic component may be mounted on the solder ball to complete the capacitor-embedded substrate 200'.

Meanwhile, when the capacitor component 100' is formed up to the uppermost or lowermost build-up conductive layers 231 and 232, an electrode pad 240 may be formed between the first and second external electrodes of the capacitor component 100' and the solder ball. Accordingly, connectivity between the capacitor component 100' and the solder ball 270 may be improved.

As set forth above, as one of the various effects of the present disclosure, high capacitance of the capacitor component may be improved, and electrical connectivity between the internal electrode and the external electrode may be improved.

As one of the various effects of the present disclosure, an aspect of the present disclosure is to provide a highly-integrated capacitor-embedded substrate by reducing impedance of the capacitor-embedded substrate by minimizing an electrical connection path between the capacitor component and the active component, and by increasing a proportion of capacitor components embedded in the core layer.

However, various and beneficial advantages and effects of the present disclosure are not limited to the above, and will be more easily understood in the course of describing specific embodiments of the present disclosure.

While example embodiments have been shown and described above, it will be apparent to those skilled in the art that modifications and variations could be made without departing from the scope of the present invention as defined by the appended claims.

What is claimed is:

1. A capacitor component, comprising:
   a body including first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis;
   a first external electrode disposed on the first surface of the body and connected to the first internal electrode; and
   a second external electrode disposed on the second surface of the body and connected to the second internal electrode,
   wherein the first internal electrode and the second internal electrode include different metals,
   wherein at least one of the first or second dielectric layer contacts both the first and second internal electrodes, and
   wherein the first internal electrode comprises a region protruding from the first surface of the body in the first direction or the second internal electrode comprises a region protruding from the second surface of the body in a direction opposing the first direction.

2. The capacitor component of claim 1, wherein
   the first internal electrode comprises a region protruding from the first surface of the body in the first direction, and
   the second internal electrode comprises a region protruding from the second surface of the body in a direction opposing the first direction.

3. The capacitor component of claim 1, wherein one end of the second internal electrode is in contact with the first surface of the body, and one end of the first internal electrode is in contact with the second surface of the body, and
   the capacitor component further comprises a first short-circuit prevention layer disposed at the one end of the second internal electrode, in contact with the first surface of the body, and a second short-circuit prevention layer disposed at the one end of the first internal electrode, in contact with the second surface of the body.

4. The capacitor component of claim 3, wherein the first external electrode is disposed on the first short-circuit prevention layer to be in contact with the region of the first internal electrode protruding from the first surface of the body and is separated from the second internal electrode by the first short-circuit prevention layer,
   the second external electrode is disposed on the second short-circuit prevention layer to be in contact with the region of the second internal electrode protruding from the second surface of the body and is separated from the first internal electrode by the second short-circuit prevention layer.

5. The capacitor component of claim 1, wherein the second internal electrode is disposed to be spaced apart from the first surface of the body, and the first internal electrode is disposed to be spaced apart from the second surface of the body.

6. The capacitor component of claim 1, further comprising a plating layer disposed on the first and second external electrodes.

7. The capacitor component of claim 1, further comprising a cover layer disposed on a side surface of the body.

8. A capacitor component, comprising:
   a body including first and second surfaces opposing each other in a first direction, wherein, in the body, a first internal electrode, a second internal electrode, a first dielectric layer interposed between the first and second internal electrodes, and a second dielectric layer disposed on the second internal electrode are wound in the first direction as a winding axis,
   a first external electrode disposed on the first surface of the body and connected to the first internal electrode; and
   a second external electrode disposed on the second surface of the body and connected to the second internal electrode,
   wherein the first internal electrode comprises a region protruding from the first surface of the body in the first direction,
   the first dielectric layer, the second dielectric layer, and the second internal electrode are terminated at the first surface,
   the second internal electrode comprises a region protruding from the second surface of the body in a direction opposing the first direction,
   the first dielectric layer, the second dielectric layer, and the first internal electrode are terminated at the second surface, and
   wherein at least one of the first or second dielectric layer respectively contacts the first or second internal electrode.

9. The capacitor component of claim 8, further comprising:
   a first short-circuit prevention layer in contact with the first surface of the body; and
   a second short-circuit prevention layer in contact with the second surface of the body.

10. The capacitor component of claim 9, wherein the first internal electrode is disposed on the first short-circuit prevention layer, and
    the second internal electrode is disposed on the second short-circuit prevention layer.

11. The capacitor component of claim 8, further comprising a plating layer disposed on the first and second external electrodes.

12. The capacitor component of claim 8, further comprising a cover layer disposed on a side surface of the body.

* * * * *